(12) United States Patent
Pan

(10) Patent No.: US 11,889,922 B2
(45) Date of Patent: Feb. 6, 2024

(54) BRACKET FOR WALL-MOUNTED SCREEN AND BRACKET SYSTEM

(71) Applicant: Beijing Huaqing Technology Co., Ltd, Beijing (CN)

(72) Inventor: Zhenguo Pan, Beijing (CN)

(73) Assignee: Beijing Huaging Technology Co., Ltd, Beijing (CN)

( * ) Notice: Subject to any disclaimer, the term of this patent is extended or adjusted under 35 U.S.C. 154(b) by 0 days.

(21) Appl. No.: 17/857,573

(22) Filed: Jul. 5, 2022

(65) Prior Publication Data

US 2023/0263305 A1    Aug. 24, 2023

(30) Foreign Application Priority Data

Feb. 22, 2022 (CN) .......................... 202220352625.4
Apr. 20, 2022 (CN) .......................... 202220935217.1

(51) Int. Cl.
*A47B 97/00* (2006.01)

(52) U.S. Cl.
CPC .................................. *A47B 97/001* (2013.01)

(58) Field of Classification Search
None
See application file for complete search history.

(56) References Cited

U.S. PATENT DOCUMENTS

| 8,333,355 | B2 * | 12/2012 | Stifal | F16M 11/2092 248/920 |
| 8,910,580 | B1 * | 12/2014 | Cockrell | A47B 81/06 108/50.02 |
| 9,265,346 | B1 * | 2/2016 | Forney | A47B 97/001 |
| 11,598,478 | B2 * | 3/2023 | Kaplan | F16M 11/04 |
| 2002/0033436 | A1 * | 3/2002 | Peng | F16M 13/02 248/284.1 |
| 2005/0210695 | A1 * | 9/2005 | Muday | F16M 13/02 33/613 |
| 2006/0176418 | A1 * | 8/2006 | Anderson | G06F 1/1607 349/58 |
| 2007/0007412 | A1 * | 1/2007 | Wang | F16M 13/02 248/284.1 |
| 2017/0102108 | A1 * | 4/2017 | Baker | F16M 13/02 |

* cited by examiner

Primary Examiner — Steven M Marsh

(57) ABSTRACT

The present invention relates to a wall-mounted screen bracket for wall-mounted screen and bracket system, comprising a screen bracket main body and a tray, the tray is arranged on the screen bracket main body, an extension socket installation structure and a threading opening are arranged on the tray, the extension socket is arranged and fixed in the extension socket installation structure, and the power cord of the extension socket is connected with the outside world through the threading opening. The present invention is also concerned with a wall-mounted screen bracket system, which includes the wall-mounted screen bracket and an extension socket arranged on the extension socket installation structure. The advantageous effects of the present invention are as follows: solving the problem of random arrangement of the extension socket that supplies power to the screen and high potential safety hazards, and improving the appearance of the screen bracket by arranging an extension socket installation structure on the screen bracket, and an extension socket can be arranged on the above-mentioned wall-mounted screen bracket.

11 Claims, 7 Drawing Sheets

BRACKET FOR WALL-MOUNTED SCREEN AND BRACKET SYSTEM

CROSS REFERENCE TO RELATED APPLICATION

This application claims priority benefit of Chinese invent Application No. 202220352625.4, filed on Feb. 22, 2021, and the entire contents of which are incorporated herein by reference.

This application claims priority benefit of Chinese invent Application No. 202220935217.1, filed on Apr. 20, 2021, and the entire contents of which are incorporated herein by reference.

TECHNICAL FIELD OF THE INVENTION

The present invention relates to a screen bracket, particularly to a bracket for wall-mounted screen and a bracket system.

BACKGROUND OF THE INVENTION

The wall-mounted screen bracket is a screen peripheral device specially developed for flat-panel TVs, LCD TVs, computer monitors and other equipment. The wall-mounted screen bracket is suitable for family living rooms, bedrooms, offices, conference halls, exhibition halls, hotels, airports, railway stations, hospitals, bus stops, shopping plazas and other places. The wall-mounted screen bracket can hang the screen on the wall to reduce the occupied space. However, there is a high demand for electricity around the wall-mounted screen bracket, and the required extension sockets have nowhere to be placed, and can only be placed on the wall or on the ground. There is no good way to store them, so they are easily affected by the outside world, and have potential safety hazards, and are inconvenient to use, and affect the appearance of the screen bracket.

SUMMARY OF THE INVENTION

The present invention aims to provide a bracket for wall-mounted screen and a bracket system, which solves the problem of random arrangement of the extension socket that supplies power to the screen and high potential safety hazards, and can also improve appearance of the screen bracket by arranging extension socket installation structures on the screen bracket. The present invention also aims to provide a bracket system, in which an extension socket is arranged on the above-mentioned bracket.

In order to realize the above-mentioned aims of the present invention, the present invention provides the following technical solutions:

a bracket for wall-mounted screen, comprising a screen bracket main body and a tray, the tray is arranged on the screen bracket main body, an extension socket installation structure and a threading opening are arranged on the tray, an extension socket is arranged and fixed in the extension socket installation structure, and the power cord of the extension socket is connected with the outside world through the threading opening.

Preferably, the extension socket installation structure is an embedded opening, the extension socket is inserted and fixed in the embedded opening. The extension socket is inserted into the embedded opening of the tray, so the extension socket can be well hidden and the storage effect of the extension socket is good.

Preferably, a mounting orifice is arranged next to the embedded opening, an extension part is arranged on the extension socket, and a fixing orifice is arranged on the extension part. The extension socket is inserted in the embedded opening, and the fixing orifice and the mounting orifice are aligned, and the extension socket is fixed in the embedded opening by the cooperation of screws and nuts, so the extension socket is firmly fixed and not easy to fall off.

Preferably, a wire management structure is arranged on the tray, the wire management structure includes a wire management slot, a wire winding part and an opening. The wire management slot is communicated with the wire winding part, the opening is arranged on the wire management slot. And the wire enters the wire management slot through the opening and slides along the wire management slot to the wire winding part to limit the position, which can well limit the position of the connection electric wire of the electrical appliance through the wire winding part, so the connection electric wire is not easy to be entangled together, which improves the cleanliness and appearance, and the wire can be removed only by sliding it out from the wire winding part and through the wire management slot to the opening, which is convenient and quick to use.

Preferably, an atmosphere lamp is arranged on the screen bracket main body, and the atmosphere lamp can be turned on when the screen is used in a dark place, so as to reduce the brightness difference between the screen and the outside world and protect the eyes of the user, and the atmosphere lamp can emit lights of different colors according to the colors displayed on the screen, so as to fit the screen effect and improve the use experience of the screen.

Preferably, a vertical distance adjustment rod, a lateral distance adjustment rod and a fixing support are arranged on the screen bracket main body, the tray is arranged on the lateral distance adjustment rod, the lateral distance adjustment rod is arranged on the vertical distance adjustment rod, and the vertical distance adjustment rod is arranged on the fixing support. The installation position of the screen is adjusted by the vertical distance adjustment rod and the lateral distance adjustment rod, so as to ensure that the user can install the screen in the position he wants to adapt to different usage needs and improve the user experience.

Preferably, an assembly orifice is arranged on the tray, and a lateral chute is arranged on the lateral distance adjustment rod, and the assembly orifice is fixed at any position of the lateral chute by screws and nuts. When it is necessary to adjust the lateral distance of the tray, just unscrew the screw on the assembly orifice from the nut, adjust the position of the lateral chute directly facing the assembly orifice, and then screw the screw and nut back to complete the adjustment of the lateral distance.

Preferably, a connecting member is arranged on the vertical distance adjustment rod, a travel groove is arranged on the connecting member, and the lateral distance adjustment rod is installed at any position of the travel groove by means of screws and nuts. When it is necessary to adjust the distance between the vertical distance adjustment rod and the lateral distance adjustment rod, just unscrew the screw on the travel groove from the nut, adjust the position of the travel groove directly facing the lateral distance adjustment rod, and then screw the screw and nut back to complete the adjustment of the distance between the vertical distance adjustment rod and the lateral distance adjustment rod.

Preferably, a vertical chute is arranged on the vertical distance adjustment rod, a positioning orifice is arranged on the fixing support, and the positioning orifice is fixed at any position of the vertical chute by screws and nuts. When it is necessary to adjust the vertical distance of the tray, just unscrew the screw on the positioning orifice from the nut, adjust the position of the vertical chute directly facing the positioning orifice, and then screw the screw and nut back to complete the adjustment of the vertical distance.

Preferably, a bent member is connected to the lower part of the vertical distance adjustment rod, the bent member is fixed on the travel groove, and the bent member can be used to place some items matched with the screen to save space.

And a system is provided, which comprises the above-mentioned bracket and an extension socket, which is arranged on the extension socket installation structure.

Compared with the prior art, the advantageous effects of the present invention are as follows:

- in the present invention, a tray is arranged on the screen bracket main body, an extension socket installation structure is arranged on the tray, the extension socket is arranged in the extension socket installation structure, so the extension socket does not need to be placed on the wall or the ground; because the extension socket is used to supply power to the electrical device, it may cause potential safety hazards if the extension socket is placed arbitrarily, and it is extremely dangerous whether the user's water is poured into the extension socket or his hand accidentally touches the jacks of the extension socket; in the present invention, the extension socket can be stored well in the extension socket installation structure on the tray, so on the one hand, the screen bracket looks uncluttered and beautiful and generous, because the extension socket can be stored, and on the other hand, the safety guarantees can be obtained, accidents are not easy to occur, and the use is convenient;
- moreover, in the present invention, a threading opening is arranged on the tray, and the extension socket generally needs a thicker power cord to connect the live wire, neutral wire and ground wire of the extension socket with the indoor socket, so as to ensure that the extension socket is energized and is safe; the threading opening can provide a place for the power cord to pass through, when in use the power cord can be connected to the outside world without being bent, and it will not be damaged due to bending and cause electric leakage, which can improve the safety of the extension socket and the service life of the power cord.

Therefore, the present invention provides a bracket for wall-mounted screen, which solves the problem of random arrangement of the extension sockets that supplies power to the screen and high potential safety hazards, and can also improve the appearance of the screen bracket by arranging an extension socket installation structure on the screen bracket. And the present invention also provides a bracket system, in which an extension socket is arranged on the bracket.

DETAILED DESCRIPTION OF THE PREFERRED EMBODIMENT

The technical solutions in the embodiments of the present invention will be explicitly and completely described below in conjunction with the accompanying drawings in the embodiments of the present invention. Apparently, the described embodiments are only some of the embodiments of the present invention, rather than all of the embodiments. Based on the embodiments of the present invention, all the other embodiments obtained by those of ordinary skill in the art without inventive efforts shall fall within the protection scope of the present invention.

It is to be noted that, all the directional indications (such as up, down, left, right, front, rear . . . ) in the embodiments of the present invention are only used to explain the relative positional relationships and motion conditions between various components in a particular attitude (as shown in the accompanying drawings). If the particular attitude changes, the directional indication also changes accordingly.

In addition, descriptions such as "first" and "second" in the present invention are only intended for illustrative purposes, but cannot be construed as indicating or implying their relative importance or implicitly indicating the number of the technical features as indicated. Thus, the features defined with "first" and "second" may explicitly or implicitly include at least one of the features; next, in the description of the present invention, "a plurality of" means at least two, such as two or three, unless otherwise expressly and specifically limited.

In the present invention, unless otherwise expressly specified and defined, the terms such as "connected" and "fixed" should be understood in a broad sense, for example, "fixed" may be a fixed connection, a detachable connection, or an integral formation; may be a mechanical connection or an electrical connection; may be a direct connection or an indirect connection through an intermediate medium, and may be an internal communication between two elements or an interaction relationship between two elements, unless otherwise specifically defined. For those of ordinary skill in the art, the specific meanings of the above-described terms in the present invention may be understood according to specific conditions.

In addition, the technical solutions among various embodiments of the present invention may be combined with each other, but has to be based on a possible implementation by those of ordinary skill in the art. When the combination of technical solutions involves mutual contradiction or cannot be implemented, it should be considered that such combination of technical solutions neither is present nor falls within the protection scope claimed by the present invention.

Figure 1:
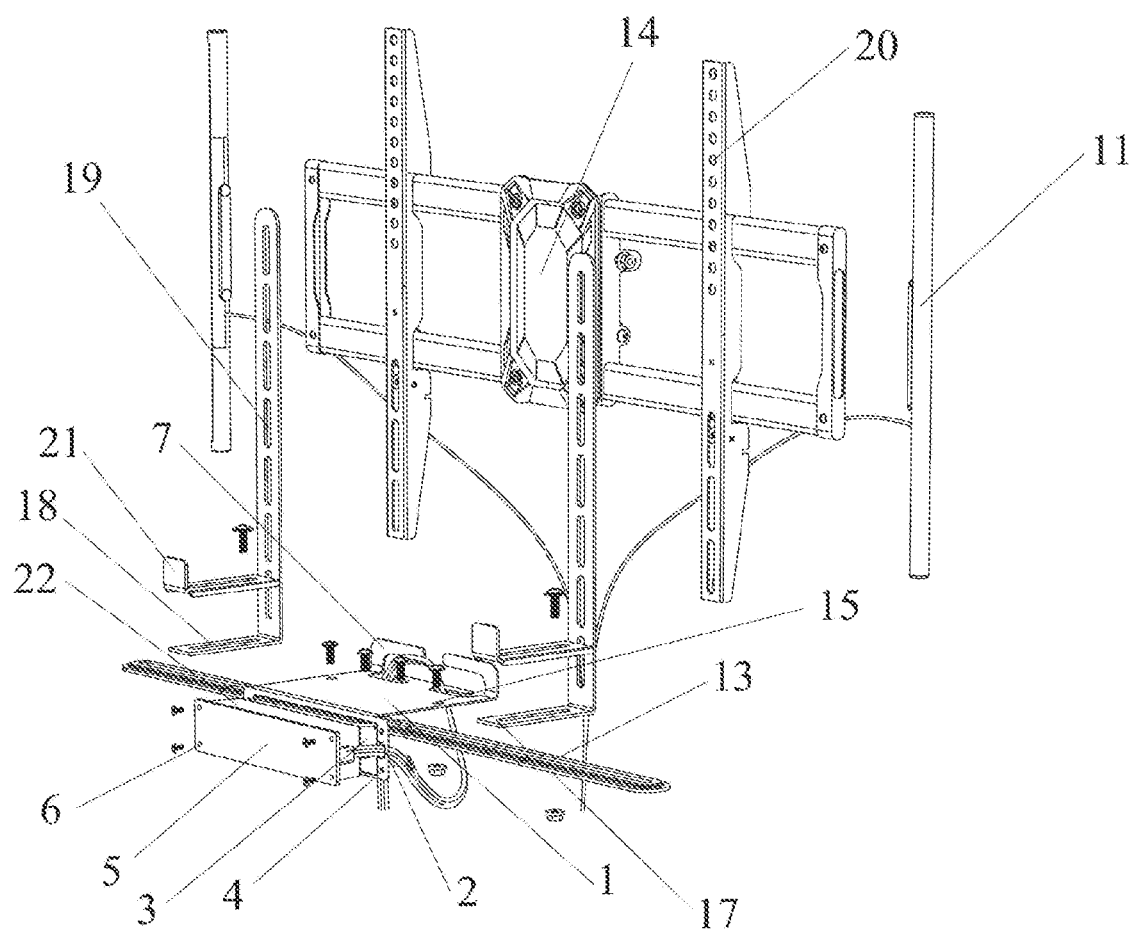
FIG. 1 is an exploded schematic structural view of the present invention.
Figure 2:
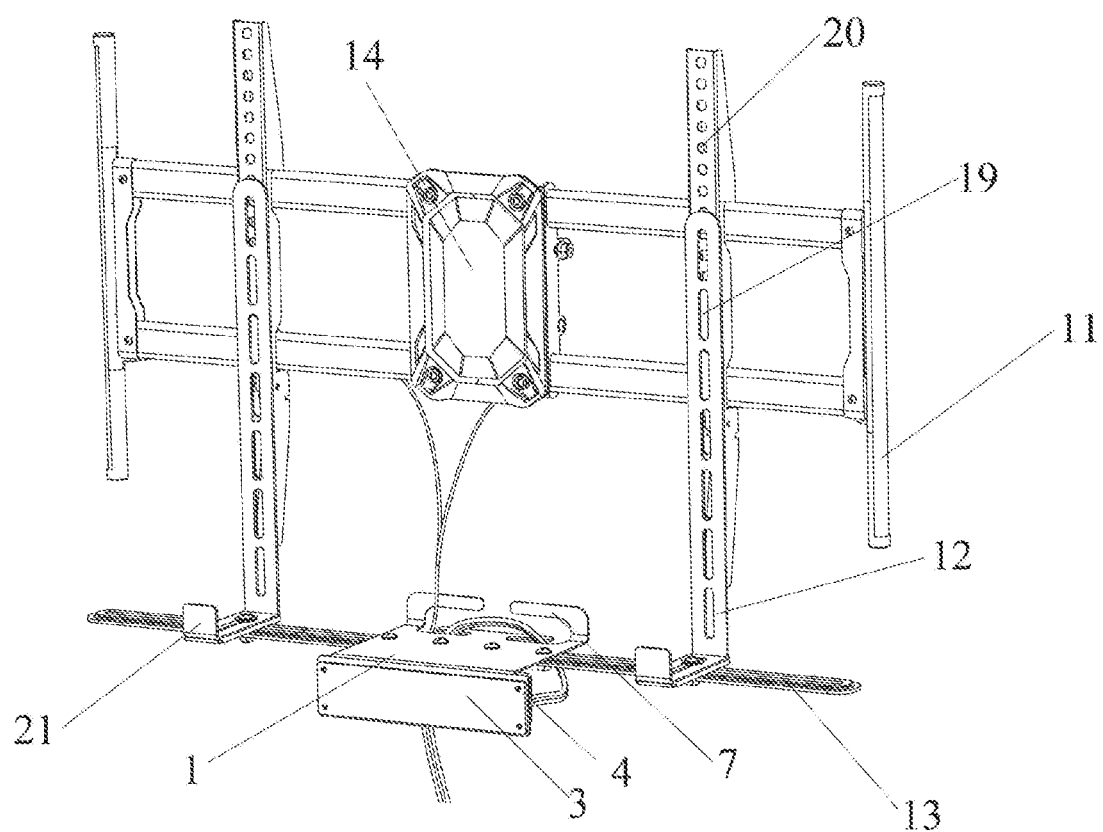
FIG. 2 is an overall schematic structural view of the present invention.
Figure 3:
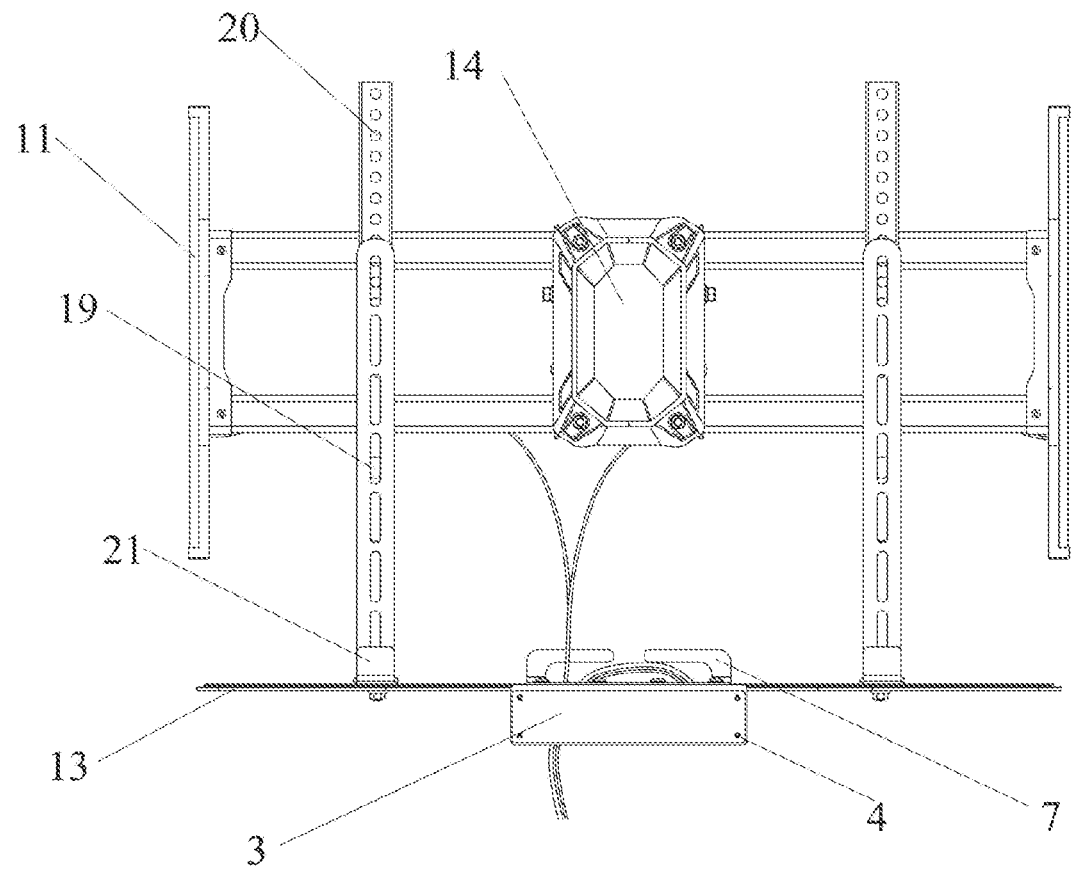
FIG. 3 is a front schematic structural view of the present invention.
Figure 4:
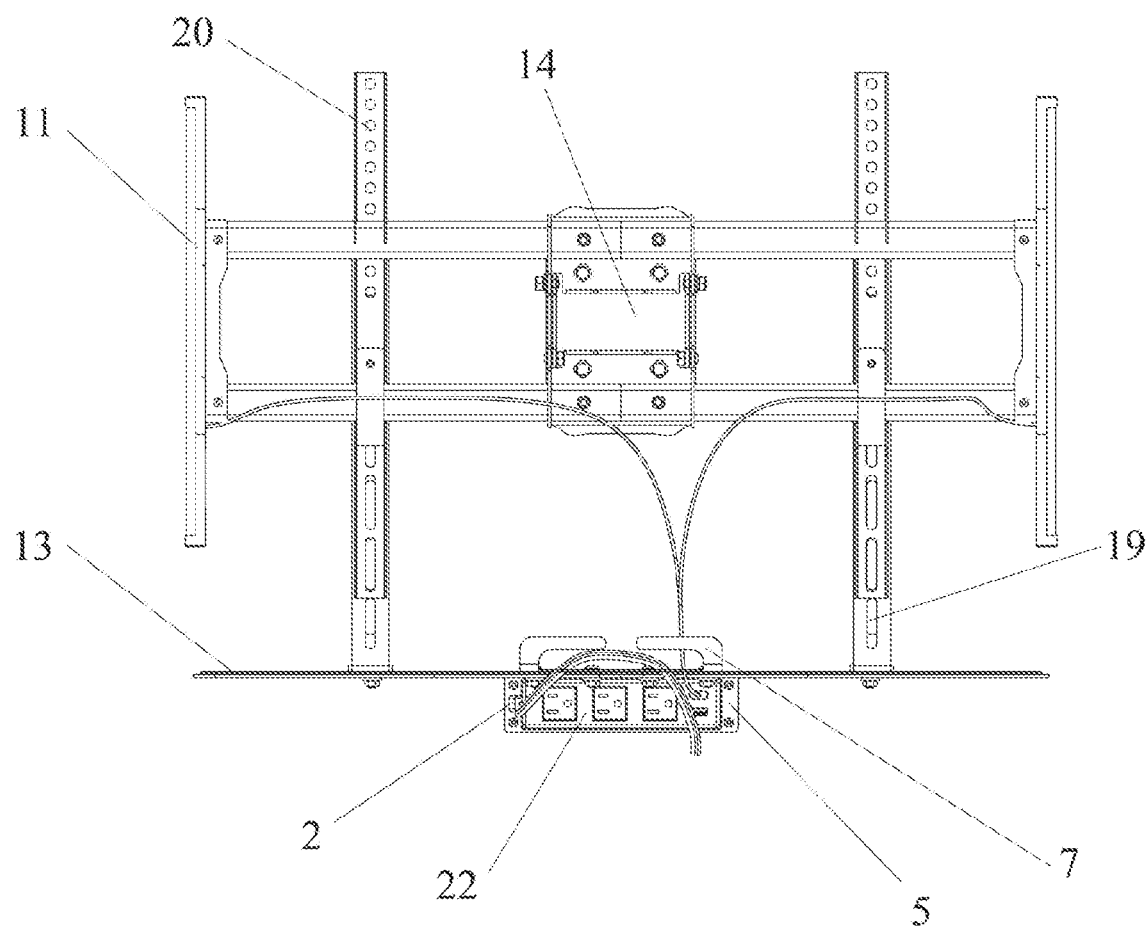
FIG. 4 is a rear schematic structural view of the present invention.
Figure 5:
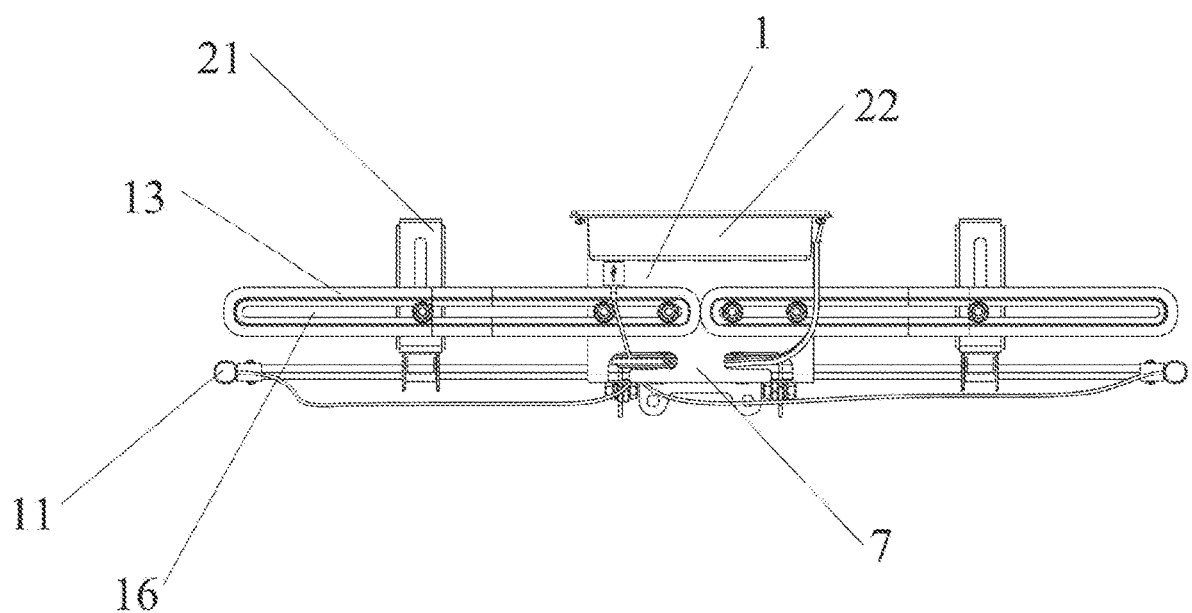
FIG. 5 is a bottom schematic structural view of the present invention.
Figure 6:
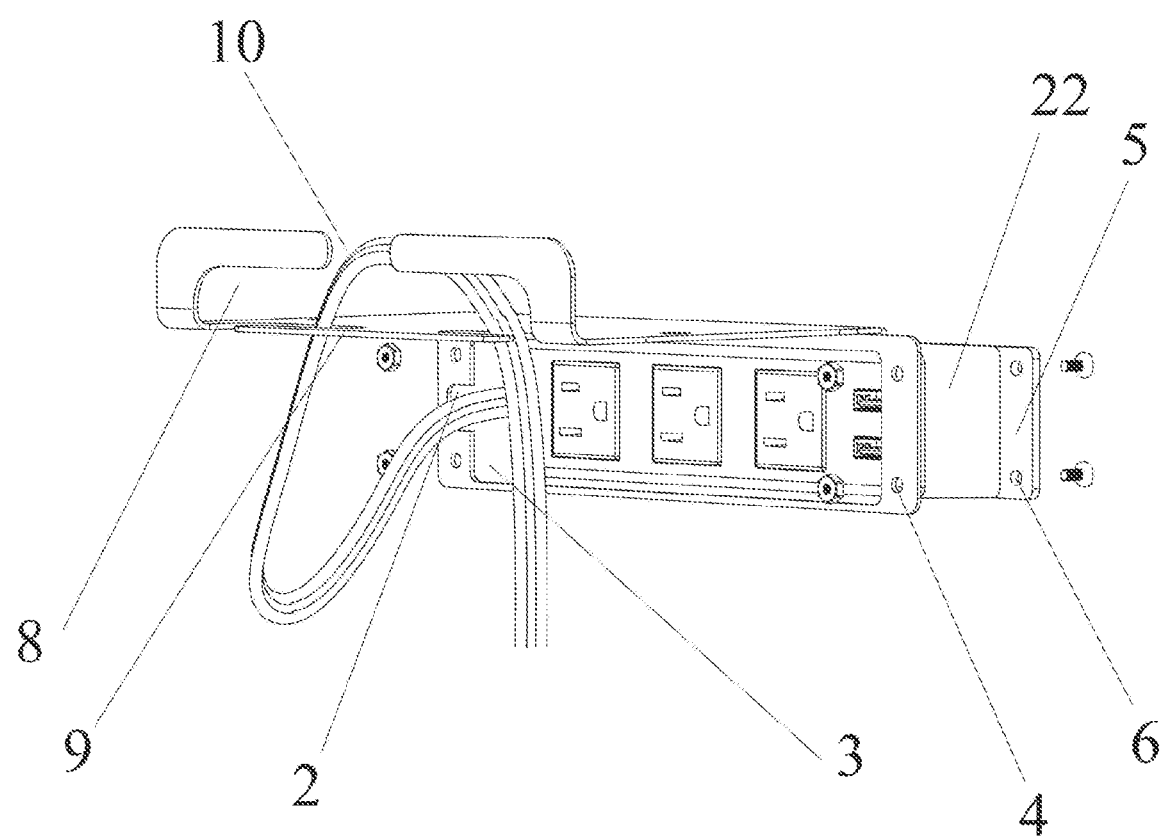
FIG. 6 is a schematic structural view of the assembly of the extension socket and the tray according to the present invention.
Figure 7:
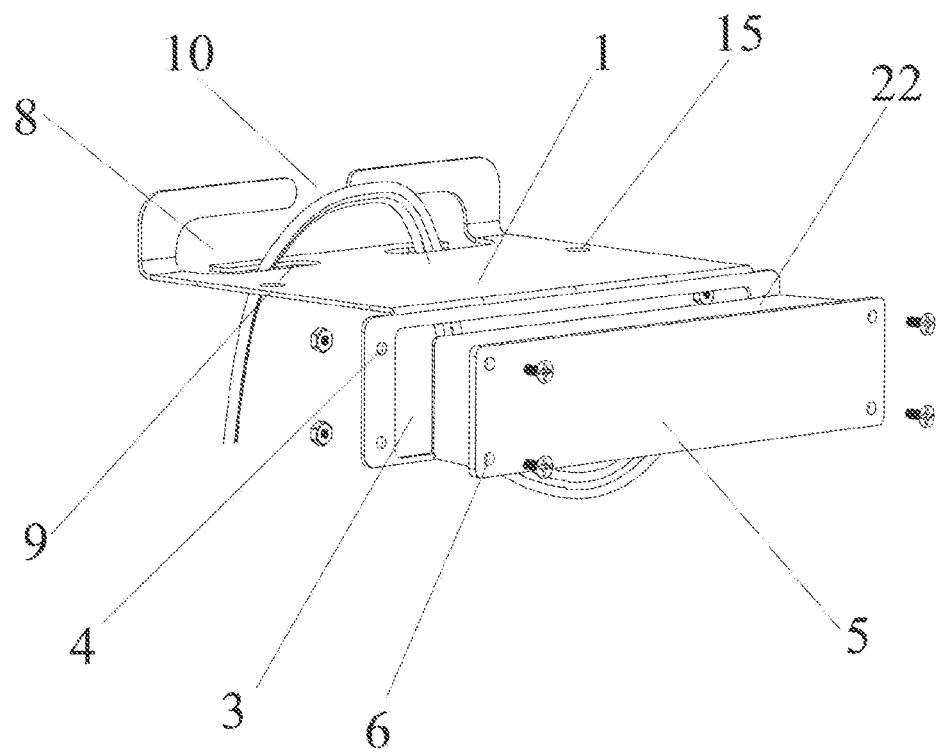
FIG. 7 is a rear schematic structural view of the extension socket and the tray according to the present invention.

Please refer to FIG. 1-FIG. 7, FIG. 1 is an exploded schematic structural view of the present invention; FIG. 2 is an overall schematic structural view of the present invention; FIG. 3 is a side schematic structural view of the present invention; FIG. 4 is a rear schematic structural view of the present invention; FIG. 5 is a bottom schematic structural view of the present invention; FIG. 6 is a schematic structural view of the assembly of the extension socket and the tray according to the present invention; FIG. 7 is a rear schematic structural view of the extension socket and the tray according to the present invention.

An embodiment of the present invention provides a bracket for wall-mounted screen. The names of the members corresponding to the reference signs in the figures are as follows: tray 1, threading opening 2, embedded opening 3, mounting orifice 4, extension part 5, fixing orifice 6, wire management structure 7, wire management slot 8, wire winding part 9, opening 10, atmosphere lamp 11, vertical distance adjustment rod 12, lateral distance adjustment rod 13, fixing support 14, assembly orifice 15, lateral chute 16, connecting member 17, travel groove 18, vertical chute 19, positioning orifice 20, bent member 21 and extension socket 22.

A bracket for wall-mounted screen, comprising a screen bracket main body and a tray 1, the tray 1 is arranged on the screen bracket main body, an extension socket installation structure and a threading opening 2 are arranged on the tray 1, the extension socket 22 is arranged and fixed in the extension socket installation structure, and the power cord of the extension socket 22 is connected with the outside world through the threading opening 2.

The extension socket installation structure is an embedded opening 3, the extension socket 22 is inserted into the embedded opening 3 and fixed. The extension socket 22 is inserted into the embedded opening 3 of the tray 1, so the extension socket 22 can be well hidden and the storage effect of the extension socket 22 is good.

A mounting orifice 4 is arranged next to the embedded opening 3, an extension part 5 is arranged on the extension socket 22, and a fixing orifice 6 is arranged on the extension part 5. The extension socket 22 is inserted in the embedded opening 3, and the fixing orifice 6 and the mounting orifice 4 are aligned, and the extension socket 22 is fixed in the embedded opening 3 by the cooperation of screws and nuts, so the extension socket 22 is firmly fixed and not easy to fall off.

A wire management structure 7 is arranged on the tray 1, the wire management structure 7 includes a wire management slot 8, a wire winding part 9 and an opening 10. The wire management slot 8 is communicated with the wire winding part 9, the opening 10 is arranged on the wire management slot 8. And the wire enters the wire management slot 8 through the opening 10 and slides along the wire management slot 8 to the wire winding part 9 to limit the position thereof, which can well limit the position of the connection electric wire of the electrical appliance by the wire winding part 9, so the connection electric wire is not easy to be entangled together, which improves the cleanliness and appearance, and the wire can be removed only by sliding it out from the wire winding part 9 and through the wire management slot 8 to the opening 10, which is convenient and quick to use.

An atmosphere lamp 11 is arranged on the screen bracket main body, and the atmosphere lamp 11 can be turned on when the screen is used in a dark place, so as to reduce the brightness difference between the screen and the outside world and protect the eyes of the user, and the atmosphere lamp can emit lights of different colors according to the colors displayed on the screen, so as to fit the screen effect and improve the use experience of the screen.

A vertical distance adjustment rod 12, a lateral distance adjustment rod 13 and a fixing support 14 are arranged on the screen bracket main body, the tray 1 is arranged on the lateral distance adjustment rod, the lateral distance adjustment rod is arranged on the vertical distance adjustment rod, and the vertical distance adjustment rod 12 is arranged on the fixing support 14. The installation position of the screen is adjusted by the vertical distance adjustment rod 12 and the lateral distance adjustment rod 13, so as to ensure that the user can install the screen in the position he wants to adapt to different usage needs and improve the user experience.

An assembly orifice 15 is arranged on the tray 1, and a lateral chute 16 is arranged on the lateral distance adjustment rod 13, and the assembly orifice 15 is fixed at any position of the lateral chute 16 by screws and nuts. When it is necessary to adjust the lateral distance of the tray 1, just unscrew the screw on the assembly orifice 15 from the nut, adjust the position of the lateral chute 16 directly facing the assembly orifice 15, and then screw the screw and nut back to complete the adjustment of the lateral distance.

A connecting member 17 is arranged on the vertical distance adjustment rod 12, a travel groove 18 is arranged on the connecting member 17, and the lateral distance adjustment rod 13 is installed at any position of the travel groove 18 by means of screws and nuts. When it is necessary to adjust the distance between the vertical distance adjustment rod 12 and the lateral distance adjustment rod 13, just unscrew the screw on the travel groove 18 from the nut, adjust the position of the travel groove 18 directly facing the lateral distance adjustment rod 13, and then screw the screw and nut back to complete the adjustment of the distance between the vertical distance adjustment rod 12 and the lateral distance adjustment rod 13.

A vertical chute 19 is arranged on the vertical distance adjustment rod 12, a positioning orifice 20 is arranged on the fixing support 14, and the positioning orifice 20 is fixed at any position of the vertical chute 19 by screws and nuts. When it is necessary to adjust the vertical distance of the tray 1, just unscrew the screw on the positioning orifice 20 from the nut, adjust the position of the vertical chute 19 directly facing the positioning orifice 20, and then screw the screw and nut back to complete the adjustment of the vertical distance.

A bent member 21 is connected to the lower part of the vertical distance adjustment rod 12, the bent member 21 is fixed on the travel groove 18, and the bent member 21 can be used to place some items matched with the screen to save space.

And a bracket system for wall-mounted screen is provided, which comprises the bracket for wall-mounted screen and an extension socket 22, which is arranged on the extension socket installation structure. The extension socket 22 is firmly installed, not easy to fall off, and easy to install.

The using method and working method of the present invention are as follows: Installing the fixing support 14 on the wall, and adjusting the vertical distance adjustment rod 12 to an appropriate position, and fixing them together by means of screws and nuts passing through the vertical chute 19 and the positioning orifice 20, and making the lateral distance adjustment rod 13 connect with the connecting member 17; after adjusting the distance, fixing the lateral distance adjustment rod 13 and the bent part 21 together on the travel groove 18, and aligning the assembly orifice 15 of the tray 1 with the lateral chute 16, and then fixing the tray 1 on the lateral distance adjustment rod 13 by screws and nuts.

When installing the extension socket 22, it is only necessary to insert the extension socket 22 into the embedded opening 3, the power cord of the extension socket 22 passes through the threading opening 2 and is connected to the outside world. The fixing orifice 6 of the extension part 5 of the extension socket 22 is aligned to the mounting orifice 4 next to the embedded opening 3, the extension socket 22 is fixed by screws and nuts, and the connection electric wire of the atmosphere lamp 11 is inserted into the extension socket 22, and then the installation of the extension socket 22 is completed.

Compared with the prior art, the advantageous effects of the present invention are as follows:

in the present invention, a tray 1 is arranged on the screen bracket main body, an extension socket installation structure is arranged on the tray 1, the extension socket 22 is arranged in the extension socket installation structure, so the extension socket 22 does not need to be placed on the wall or the ground; because the extension socket 22 is used to supply power to the electrical device, it may cause potential safety hazards if the extension socket is placed arbitrarily, and it is extremely dangerous whether the user's water is poured into the extension socket or his hand accidentally touches the jacks of the extension socket; in the present invention, the extension socket 22 can be stored well in the extension socket installation structure on the tray 1, so on the one hand, the screen bracket looks uncluttered and beautiful and generous, because the extension socket 22 can be stored, and on the other hand, the safety guarantees can be obtained, accidents are not easy to occur, and the use is convenient;

moreover, in the present invention, a threading opening 2 is arranged on the tray 1, and the extension socket 22 generally needs a thicker power cord to connect the live wire, neutral wire and ground wire of the extension socket 22 with the indoor socket, so as to ensure that the extension socket 22 is energized and is safe; the threading opening 2 can provide a place for the power cord to pass through, when in use the power cord can be connected to the outside world without being bent, and it will not be damaged due to bending and cause electric leakage, which can improve the safety of the extension socket 22 and the service life of the power cord.

Therefore, the present invention provides a bracket for wall-mounted screen, which solves the problem of random arrangement of the extension sockets that supplies power to the screen and high potential safety hazards, and can also improve the appearance of the screen bracket by arranging an extension socket installation structure on the screen bracket. And the present invention also provides a bracket system for wall-mounted screen, in which an extension socket is arranged on the bracket for wall-mounted screen.

The above are only the preferred embodiments of the present invention. It should be noted that the above preferred embodiments should not be regarded as limitations of the present invention, and the protection scope of the present invention should be based on the scope defined by the claims. For those skilled in the art, several improvements and modifications can be made without departing from the spirit and scope of the present invention, and these improvements and modifications should also be regarded as the protection scope of the present invention.

What is claimed is:

1. A bracket for wall-mounted screen, comprising a screen bracket main body and a tray, the said tray being arranged on the said screen bracket main body, an extension socket installation structure and a threading opening being arranged on the said tray, an extension socket being arranged and fixed in the said extension socket installation structure, and a power cord of the said extension socket being connected with outside world through the said threading opening.

2. A bracket according to claim 1, wherein the said extension socket installation structure is an embedded opening, in which the said extension socket is inserted and fixed.

3. A bracket according to claim 2, wherein a mounting orifice being arranged next to the said embedded opening, an extension part being arranged on the said extension socket, and a fixing orifice being arranged on the said extension part, the said extension socket being inserted in the said embedded opening and the said fixing orifice and the said mounting orifice being aligned, and the said extension socket being fixed in the embedded opening by the cooperation of screws and nuts.

4. A bracket according to claim 1, wherein a wire management structure is arranged on the said tray, the said wire management structure including a wire management slot, a wire winding part and an opening, and the said wire management slot being communicated with the said wire winding part, the said opening being arranged on the said wire management slot, and the wire passes through the said opening and slides along the said wire management slot to the said wire winding part to limit the position thereof.

5. A bracket according to claim 1, wherein an atmosphere lamp is arranged on the said screen bracket main body.

6. A bracket according to claim 1, wherein a vertical distance adjustment rod, a lateral distance adjustment rod and a fixing support are arranged on the said screen bracket main body, and the said tray being arranged on the said lateral distance adjustment rod, and the said lateral distance adjustment rod being arranged on the said vertical distance adjustment rod, and the said vertical distance adjustment rod being arranged on the said fixing support, and the installation position of the said screen being adjusted by the said vertical distance adjustment rod and the said lateral distance adjustment rod.

7. A bracket according to claim 6, wherein an assembly orifice is arranged on the said tray, and a lateral chute is arranged on the said lateral distance adjustment rod, and the said assembly orifice being fixed at any position of the said lateral chute by screws and nuts.

8. A bracket according to claim 6, wherein a connecting member is arranged on the said vertical distance adjustment rod, a travel groove being arranged on the said connecting member, and the said lateral distance adjustment rod being installed at any position of the said travel groove by means of screws and nuts.

9. A bracket according to claim 6, wherein a vertical chute is arranged on the said vertical distance adjustment rod, a positioning orifice being arranged on the said fixing support, and the said positioning orifice being fixed at any position of the said vertical chute by screws and nuts.

10. A bracket according to claim 8, wherein a bent member being connected to the lower part of the said vertical distance adjustment rod, the said bent member being fixed on the said travel groove.

11. A bracket system, comprising the bracket according to claim 1 and an extension socket, which is arranged on the said extension socket installation structure.

* * * * *